Aug. 28, 1956  J. J. LIHOTA  2,760,830
BRAKE CYLINDER PRESSURE RETAINING AND MAINTAINING APPARATUS
Filed May 29, 1951  2 Sheets-Sheet 1

INVENTOR.
Joseph J. Lihota
BY Frank E. Miller
ATTORNEY

Aug. 28, 1956  J. J. LIHOTA  2,760,830
BRAKE CYLINDER PRESSURE RETAINING AND MAINTAINING APPARATUS
Filed May 29, 1951  2 Sheets-Sheet 2
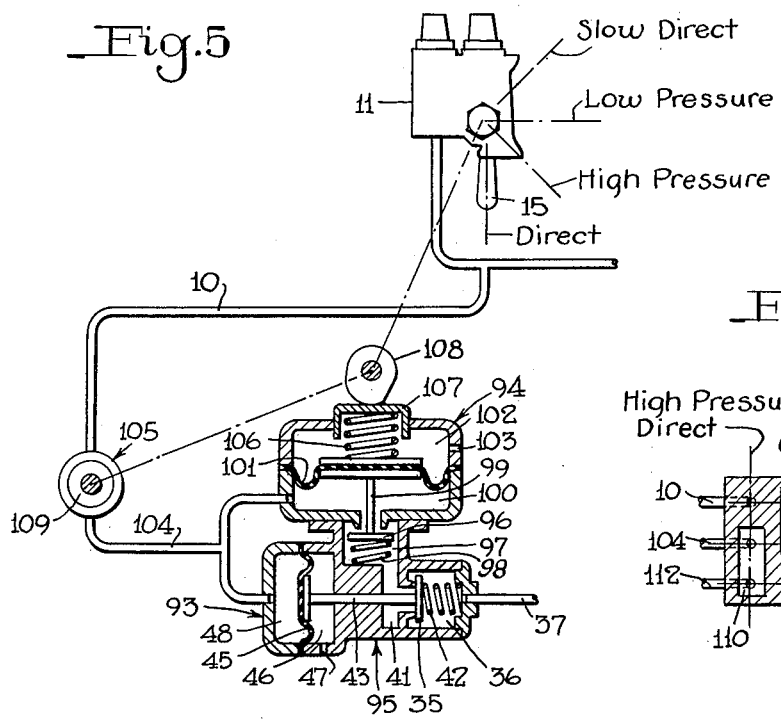
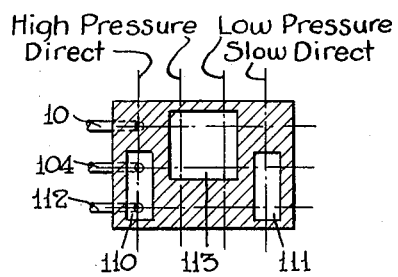
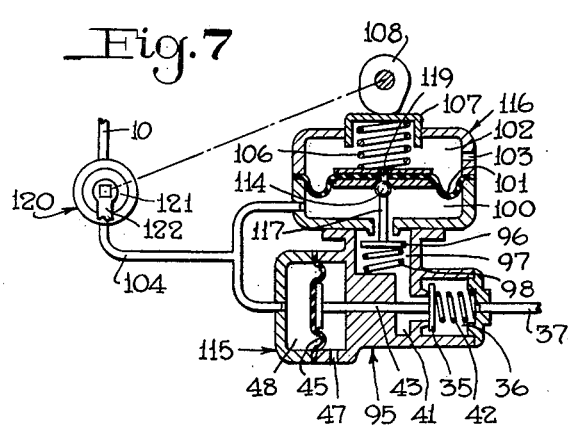
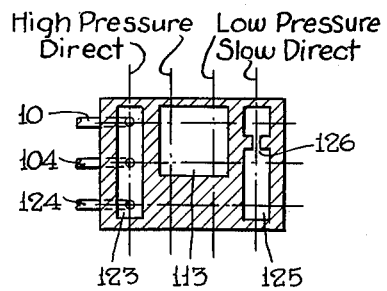
INVENTOR.
Joseph J. Lihota
BY
Frank E. Miller
ATTORNEY United States Patent Office 2,760,830
Patented Aug. 28, 1956

2,760,830

BRAKE CYLINDER PRESSURE RETAINING AND MAINTAINING APPARATUS

Joseph J. Lihota, Verona, Pa., assignor to Westinghouse Air Brake Company, a corporation of Pennsylvania Application May 29, 1951, Serial No. 228,850

4 Claims. (Cl. 303—60)

This invention relates to fluid pressure brakes and more particularly to means for retaining a chosen pressure of fluid in the brake cylinder devices on cars of a train while recharging the train brake system.

In order to ensure safe control of railway trains while descending long grades where one or more brake applications may be required, manually adjustable retaining valve devices have long been employed on the cars to limit release of fluid under pressure from the brake cylinder devices on the cars for thereby maintaining the car brakes applied with limited force while the brake pipe and associated apparatus of the brake system are being recharged in preparation for a subsequent application of brakes. Leakage of fluid under pressure from a brake cylinder device will however defeat the purpose of a retaining valve device and the principal object of the invention is therefore the provision of improved means for offsetting such leakage so as to thereby ensure that the pressure in the brake cylinder device will remain at the desired selected reduced degree.

Other objects and advantages will become apparent from the following more detailed description of the invention.

Figure 1:
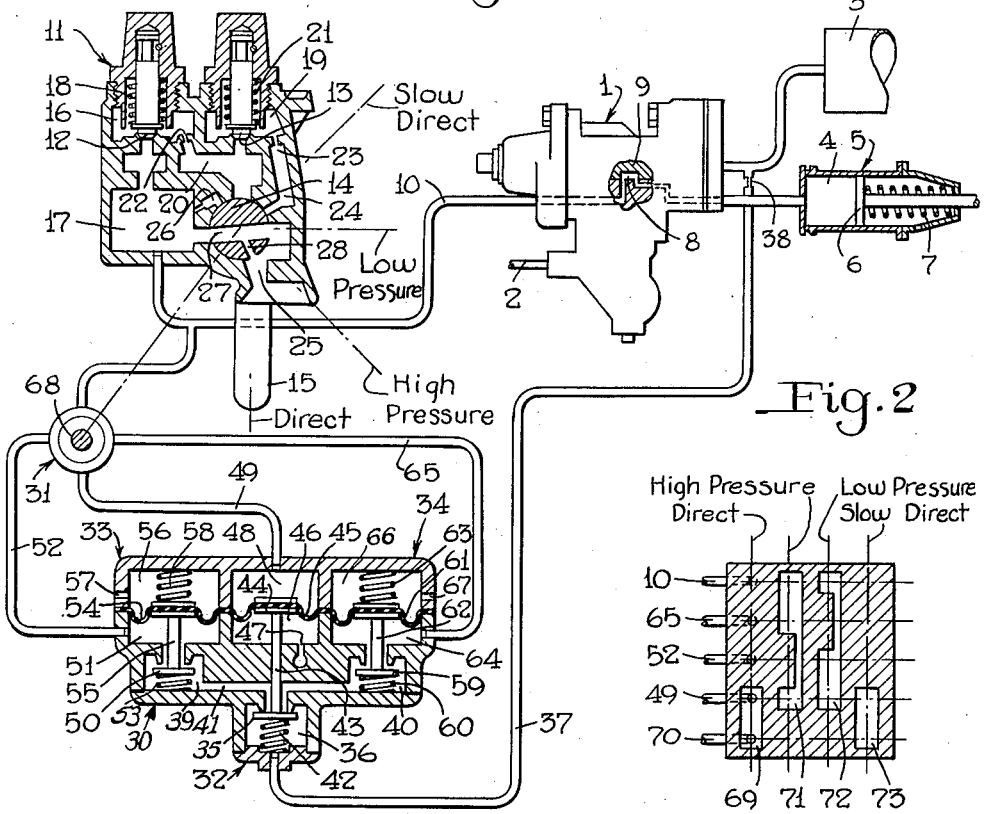
Figure 2:
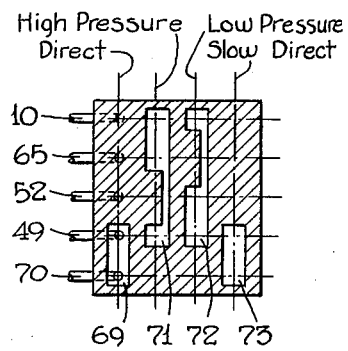

In the accompanying drawings, Fig. 1 is a diagrammatic view of a fluid pressure brake apparatus for a car embodying one form of the invention; Fig. 2 is a diagrammatic, development view of a valve constituting a part of Fig. 1; and Figs. 3, 4 and 5, 6 and 7, 8 are views similar to Figs. 1 and 2, respectively, of different embodiments of the invention.

*Description—Figs. 1 and 2*

As shown in Fig. 1, the reference numeral 1 designates a brake controlling valve device of any conventional type which is adapted to respond to a reduction in pressure in a brake pipe 2 to supply fluid under pressure from a source of fluid under pressure such as may be present in an auxiliary reservoir 3 to the pressure chamber 4 of a brake cylinder device 5. In chamber 4 the pressure of fluid will act on a brake cylinder piston 6 to move said piston against a release spring 7 to apply brakes on a car, as well-known. Upon recharging the brake pipe 2 with fluid under pressure, the brake controlling valve device 1 will operate in the usual well-known manner to recharge the auxiliary reservoir 3 with fluid under pressure from said brake pipe and at the same time open the brake cylinder pressure chamber 4 through a cavity 8 in a slide valve 9 of said device to a retainer pipe 10 for releasing fluid under pressure from said chamber either completely or partially dependent upon the adjustment of a pressure retaining valve device 11.

For illustration, the pressure retaining valve device 11 may be like that disclosed in Patent No. 2,204,796, issued on June 18, 1940, to C. C. Farmer. Briefly, the retaining valve device 11 comprises a casing containing low and high pressure retaining check valves 12, 13, respectively, and a plug valve 14 which is rotatable manually by a handle 15 to four different positions indicated by lines to which are applied the legends "Direct," "High Pressure," "Low Pressure" and "Slow Direct," respectively.

The low pressure check valve 12 is contained in a chamber 16 and is arranged to control communication between said chamber and a chamber 17 to which the retaining pipe 10 is connected, a spring 18 in chamber 16 acting on said valve urging it toward its seat with a chosen force such, for example, as to require fluid at a pressure in chamber 17 ten pounds higher than that in chamber 16 to open or unseat said check valve.

The high pressure check valve 13 contained in a chamber 19 is provided to control communication between said chamber and a chamber 20 and is urged to its seat by a spring 21 in chamber 19 with a force which may be the same as that of spring 18 on the low pressure check valve 12. Chamber 20 is open through a choke 22 to chamber 16 and chamber 19 is open through a choke 23 to a passage 24 leading to one side of the plug valve 14.

Also opening to the side of the plug valve 14 are chambers 17 and 20, an atmospheric exhaust port 25 and one end of a restricted passageway 26 the opposite end of which is open to chamber 17.

Now assuming that subsequent to effecting an application of brakes by supplying fluid under pressure to chamber 4 in the brake cylinder device 5, the parts of the triple valve device 1 have been moved back to release position for recharging the auxiliary reservoir 3 and for opening said chamber to the retaining pipe 10 and thence to chamber 17 in the pressure retaining valve device 11. With the handle 15 in "Direct" position, a passageway 27 in plug valve 14 will open chamber 17 to the direct release passage 25 whereupon fluid under pressure will be released from the brake cylinder pressure chamber 4 directly to atmosphere at the usual rate to provide for release of brakes on the car.

If the handle 15 is in "High Pressure" position, the passageway 27 in valve 14 will be disconnected from chamber 17 and open to passage 24 and a passageway 28 in said valve will connect passageway 27 to the exhaust passage 25, whereupon fluid under pressure from the retaining pipe 10 present in chamber 17 will lift the check valve 12 and flow to chamber 16 and thence to chamber 20 wherein it will act to unseat the check valve 13 and flow to chamber 19 and thence to atmosphere via passage 24, passageways 27, 28 in the plug valve 14 and the exhaust port 25. Fluid under pressure will thus be released from the brake cylinder pressure chamber 4 until, in the high pressure position of handle 15, the pressure retained in the brake cylinder pressure chamber 4 will be equal to the combined pressures of springs 18, 21 on the respective check valves 12, 13 or, for example, twenty pounds.

If the handle 15 is in the "Low Pressure" position passageway 27 in the plug valve 14 will open chamber 20 directly to the exhaust port 25 whereupon fluid released past the low pressure check valve 12 will escape directly to atmosphere and such will continue until the pressure in the brake cylinder pressure chamber 4 becomes reduced to a degree, such as ten pounds, which is insufficient to unseat the check valve 12, whereby the pressure of fluid retained in the brake cylinder pressure chamber 4 in this position of handle 15 will, for example, be ten pounds.

If the handle 15 is in the "Slow Direct" release position, the retainer pipe 10 will be open directly to atmosphere through chamber 17, the restricted passageway 26, passageway 27 in the plug valve 14 and the exhaust port 25 whereby complete release of fluid under pressure from the brake cylinder pressure chamber 4 will occur but at a slower rate than in the "Direct" position.

The structure and operation of the structure so far described is well-known. It is however to be noted that if there should be leakage of fluid under pressure from the brake cylinder pressure chamber 4 past the piston 6 the pressure in said chamber will undesirably reduce after closing of the valves 12, 13 in the "High Pressure" or "Low Pressure" positions of the retainer valve handle 15 and such is undesirable since a brake application may become completely released or reduced either of which is undesirable from the standpoint of safety of a train. The invention, which will now be described, provides for maintaining the pressure in the brake cylinder pressure chamber 4 at the pressure corresponding to the "High Pressure" position or "Low Pressure" position of handle 15 while recharging the brake system on a car or train of cars.

According to the invention, as shown in Figs. 1 and 2, I associate with the brake apparatus, so far described, a pressure maintaining valve device 30 and a selector valve device 31.

The valve device 30 comprises a supply valve device 32, a low pressure maintaining valve device 33 and a high pressure maintaining valve device 34.

The supply valve device 32 comprises a supply valve 35 contained in a chamber 36 which is adapted to be constantly supplied with fluid under pressure from any suitable source, such as the auxiliary reservoir 3, via a pipe 37 in which there is placed a choke or restriction 38. The valve 35 is provided for controlling flow of fluid under pressure from chamber 36 to two chambers 39 and 40 via a connecting passage 41 and is urged to a closed position by a spring 42 for preventing such flow. A stem 43 slidably mounted in a suitable bore in the casing of the device has one end engaging the seating side of valve 35 while the opposite end terminates in a follower head 44 engaging one side of a flexible diaphragm 45 in a chamber 46 at one side of the diaphragm. Chamber 46 is open to atmosphere through a port 47. At the opposite side of diaphragm 45 is a control chamber 48 open to a pipe 49 leading to the selector valve device 31. Upon supply of fluid under pressure to chamber 48 (as will be later described) the diaphragm 45 is adapted to deflect to operate stem 43 to open valve 35 for supplying fluid under pressure to chambers 39 and 40, while upon release of fluid under pressure from chamber 48 spring 42 is adapted to close valve 35.

The low pressure maintaining valve device 33 comprises a valve 50 contained in chamber 39 for controlling communication between said chamber and a chamber 51 open to a pipe 52 leading to the selector valve device 31, a spring 53 in chamber 39 acting on said valve for normally closing it and thereby said communication. Chamber 51 is provided at one side of a flexible diaphragm 54 which is connected by a stem 55 to the seating side of valve 50. At the opposite side of diaphragm 54 is a chamber 56 in constant communication with atmosphere via a vent 57 and containing a spring 58 acting on the diaphragm with such force as to deflect it to unseat valve 50 when opposing pressure of fluid in chamber 51 is just slightly less than that (ten pounds) at which the check valve 12 seats in the "Low Pressure" position of the retaining valve handle 15. The high pressure maintaining valve 34 is like the low pressure maintaining valve device 33 in that it comprises a check valve 59 normally urged to a closed position by a spring 60 both of which are contained in chamber 40, a flexible diaphragm 61 connected to valve 59 through a stem 62 and a spring 63 acting on said diaphragm for unseating said valve when pressure of fluid in a chamber 64 at one side of said diaphragm is just slightly less than that (twenty pounds) at which both check valves 12 and 13 seat in the "High Pressure" position of the retaining valve handle 15. The valve 59 is provided to control flow of fluid under pressure from chamber 40 to chamber 64 which is connected to a pipe 65 leading to the selector valve device 31. At the opposite side of diaphragm 61 is a chamber 66 containing spring 63 and open to atmosphere through a vent 67.

The selector valve device 31 comprises a casing to which the pipes 10, 49, 52 and 65 are connected and a plug valve 68 mounted in said casing and arranged to turn with the plug valve 14 in the retaining valve device 11. In practice the plug valves 68 and 14 may, if desired, be one and the same valve.

In the "Direct" position of the retaining valve handle 15, in which the retainer pipe 10 is open directly to atmosphere through the relatively large passageway 27 to provide normal rate of release of fluid under pressure from the brake cylinder device 5, the connections of pipes 10, 52 and 65 to the selector valve device may be closed by the plug valve 68 while pipe 49 may be vented to atmosphere through a cavity 69 in the plug valve 68 and an exhaust port 70 in the casing thereof (Fig. 2). With pipe 49 and thereby diaphragm chamber 48 vented the supply valve 35 will be seated by spring 42 so that there can be no flow of fluid under pressure from the maintaining valve device 30 to pipe 10.

Now assume that the retaining valve handle 15 is in "High Pressure" position at the time of releasing fluid under pressure from chamber 4 in the brake cylinder device 5. In this position both check valves 12, 13 in the retaining valve device will seat when the pressure in the brake cylinder chamber 5 is reduced to a chosen degree such as twenty pounds. In this position of handle 15 and thereby of plug valve 68 of the selector valve device a cavity 71 (Fig. 2) in the plug valve opens the retaining pipe 10 to pipes 49 and 65 whereby brake cylinder pressure will become effective in diaphragm chambers 48 and 64 of the maintaining valve device 30. The pressure of fluid from the brake cylinder device 5 thus provided in chamber 48 will deflect diaphragm 45 to open valve 35 for thereby supplying fluid under pressure from the source (auxiliary reservoir 3) to valve chamber 40, while brake cylinder pressure in chamber 64 will deflect diaphragm 61 against spring 63 to permit closing of valve 59 by spring 60 as long as the brake cylinder pressure equals or exceeds that at which the two check valves 12, 13 in the retaining valve device seat. After the check valves 12, 13 seat however, if leakage should reduce the pressure in the brake cylinder chamber 4 and thereby in diaphragm chamber 64 to a slightly lower degree spring 63 will unseat valve 59 to permit fluid under pressure to flow from chamber 40 to the brake cylinder device 5 to prevent pressure in chamber 4 reducing further due to leakage. The check valve 59 may be unseated, as just described, just sufficient to permit such flow of fluid under pressure to the brake cylinder pressure chamber 4 as to compensate for the leakage in which case it will remain open as long as the retaining valve handle 15 is in the "High Pressure" position. On the other hand, when the valve 59 is opened inertia may cause it to open to a greater extent, in which case, fluid under pressure will be supplied to chamber 64 at a rate greater than necessary to compensate for leakage. The pressure in chamber 64 will then increase to a degree slightly greater than the opposing pressure of spring 63 on diaphragm 61 and deflect said diaphragm to permit closing of said valve. Leakage will then again reduce the pressure in chamber 64 in response to which the valve 59 will again be opened. It is immaterial whether the valve 59 thus opens and closes or obtains a position upon opening to just compensate for leakage for, from a practical standpoint, the pressure in the brake cylinder pressure chamber 4 will remain substantially at the pressure corresponding to the "High Pressure" position of handle 15.

If the retaining valve handle 15 should be in "Low Pressure" position at the time the brake cylinder pressure chamber 4 is opened to the retainer pipe 10, a cavity 72 in the plug valve 68 will open pipe 10 to pipes 52 and 49, whereby the supply valve 35 will be opened to supply fluid under pressure to valve chamber 39 and the low pressure maintaining valve device 33 will then operate the same as the high pressure maintaining valve device 34 operated, as above described, in case of leakage of fluid under pressure from the brake cylinder pressure chamber 4 to maintain the pressure therein substantially equal to that (ten pounds) present at the time of seating of the check valve 12 in the retaining valve device, as will be evident without detailed description.

If the handle 15 should be in the "Slow Direct" position at the time of connecting the brake cylinder pressure chamber 4 to the retainer pipe 10, the plug valve 68 will lap pipes 10, 65 and 52 and vent pipe 49 via cavity 73 therein so as to prevent operation of the maintaining valve device 30, the same as in the "Direct" position of handle 15.

It will now be seen that in the "Low Pressure" and "High Pressure" position of handle 15, the retaining valve device 11 will operate in the usual manner to permit reduction in pressure in the brake cylinder pressure chamber 4 to the respective reduced degree, and that in case of leakage of fluid under pressure from said chamber, the pressure therein will be maintained against leakage substantially at the desired reduced degree by the maintaining valve device 30. In the "Direct" and "Slow Direct" positions of handle 15 the maintaining valve device 30 will be cut out of operation, it will be noted, when retention of a certain pressure in the brake cylinder pressure chamber 4 is not desired.

Figure 3:
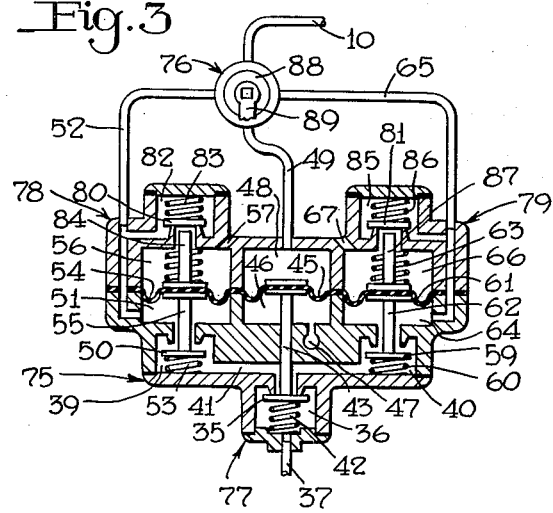
Figure 4:
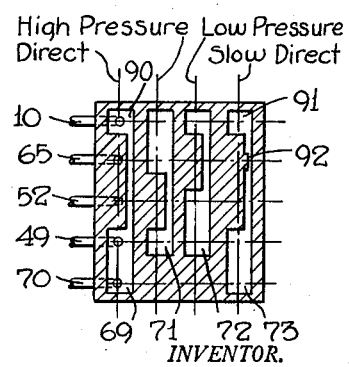

*Description—Figs. 3 and 4*

If desired, the functions of the usual pressure retaining valve device 11 and pressure maintaining valve device 30 shown in Fig. 1, may be combined into a single retaining and maintaining valve device 75, shown in Fig. 3, arranged to be controlled by a selector valve device 76.

The valve device 75 comprises a supply valve device 77, a low pressure retaining and maintaining valve device 78 and a high pressure retaining and maintaining valve device 79 and is like the maintaining valve device 30 shown in Fig. 1 except for the addition of blow down check valves 80 and 81 arranged for control by diaphragms 54, 61 of the valve devices 78, 79, respectively. Accordingly, the same reference numerals have been applied to corresponding parts in the two devices 30, 75.

The check valve 80 is contained in a chamber 82 open to pipe 52 and a spring 83 in said chamber is provided to seat said check valve which controls communication between said chamber and the atmospheric chamber 56. A stem 84 contained in chamber 56 with one end connected to diaphragm 54 has its opposite end disposed for engagement with the seated side of check valve 80 for unseating same by deflection of said diaphragm after the check valve 50 is seated. Similarly, the check valve 81 is contained in a chamber 85 open to pipe 65 and a spring 86 in said chamber is provided to seat said valve for closing communication from said chamber to the atmospheric chamber 66. A stem 87 in chamber 66 connected at one end to diaphragm 61 is provided to contact the check valve 81 and unseat same by deflection of said diaphragm after the check valve 59 is seated.

The selector valve device 76 comprises a casing to which are connected pipes 10, 49, 52 and 65, like the selector valve device 31, and which contains a plug valve 88. A handle 89 having the same positions as the retaining valve handle 15 of Fig. 1 is connected to plug valve 88 for turning it to corresponding positions. The plug valve 88 has the same cavities 69, 71, 72 and 73 as the plug valve 68 and in addition cavities 90, 91 open to cavities 69 and 73, respectively, the communication between cavities 91 and 73 including a choke 92 for performing the function of the restricted passageway 26 in the retaining valve device 11 of Fig. 1.

In operation, if selector valve handle 89 is in "Direct" position at the time fluid under pressure is released from the brake cylinder pressure chamber 4 to pipe 10 fluid under pressure will flow directly to atmosphere through cavities 90 and 69 in the plug valve 88 and exhaust port 70, pipes 65 and 52 being lapped by said valve and pipe 49 being vented the same as in the structure shown in Fig. 1.

If the selector valve handle 89 is in the "High Pressure" postiion when fluid under pressure is released from the brake cylinder pressure chamber 4 to pipe 10, such fluid will flow through cavity 71 in the plug valve 88 to pipes 65 and 49. The supply valve device 77 will thereby be operated to open supply valve 35 to supply fluid under pressure to the valve chamber 40 and at the same time brake cylinder pressure from pipe 65 becoming effective in chamber 64 on diaphragm 61 of the high pressure valve device 79 will deflect said diaphragm against spring 63 to open valve 81. With the valve 81 thus open fluid under pressure will be vented from the brake cylinder device and diaphragm chamber 66 to atmosphere via chamber 66 and vent 67 until such pressure becomes reduced to the chosen degree, such as twenty pounds, at which spring 63 will deflect diaphragm 61 downward to permit spring 86 to seat valve 81 for thereby terminating release of fluid under pressure from the brake cylinder chamber 4. If now there is leakage of fluid under pressure from the brake cylinder pressure chamber 4, the resultant reduction in pressure in chamber 64 will cause the diaphragm 61 to open the supply valve 59 to supply fluid under pressure to said chamber to compensate for such leakage, the same as in the structure shown in Fig. 1.

If the selector handle 89 is in "Low Pressure" position at the time the brake cylinder pressure chamber 4 is opened to pipe 10, said pipe will be opened by cavity 72 in the selector valve 88 to pipes 52 and 49 whereby the supply valve 35 will be opened and the low pressure valve device 78 will be operated to permit release of fluid under pressure from said chamber via valve 80 until such pressure is reduced sufficiently to permit deflection of diaphragm 54 by spring 58 and thereby closure of valve 80, and finally in case of leakage of fluid under pressure from the brake cylinder chamber 4, opening of valve 50 to compensate for leakage, as will be readily apparent from previous description.

If the selector handle 89 is in "Slow Direct" position when the brake cylinder pressure chamber 4 is opened to pipe 10, fluid under pressure will be vented from said chamber via cavity 91 in the plug valve, choke 92, cavity 73 and exhaust port 70, while pipes 65 and 52 will be lapped by said valve and pipe 49 will also be vented by way of exhaust port 70, so that the valve device 75 will not operate to either limit release of fluid under pressure from the brake cylinder device or to supply fluid under pressure thereto, thereby providing the same result as the structure of Fig. 1 provides in the corresponding position of handle.

It will now be seen that the valve device 75 of Fig. 3 will provide the same result as the retaining valve device 11 and valve device 30 of Fig. 1.

*Description—Figs. 5 and 6*

If desired, the functions of the low and high pressure maintaining valve devices 33, 34 may be combined into a single device as shown in Fig. 5 wherein numeral 93 designates a pressure maintaining device comprising a combined high, low pressure maintaining valve device 94, and a supply valve device 95.

The supply valve device 95 may be the same in structure and operation as the supply valve devices 32 and 77 previously described and the same reference numerals have therefore been applied to like parts.

The high, low pressure valve device 94 comprises a valve 96 contained in a chamber 97 open to passage 41 and thus adapted to be supplied with fluid under pressure when valve 35 is open. A spring 98 acts on valve 96 to urge it seated. A stem 99 engages the seating face of valve 96 for unseating it. The stem 99 extends into a chamber 100 where it is connected to one side of a flexible diaphragm 101 at the opposite side of which is a chamber 102 open to atmosphere through a vent 103. The chamber 100 and chamber 48 in the supply valve device 95 are both connected to a pipe 104 leading to a selector valve device 105. In chamber 102 a control spring 106 has one end bearing on the diaphragm 101 while the other end bears against a plunger 107 slidably mounted in a suitable bore in the casing of the device. By adjustment of plunger 107 in its bore the pressure of spring 106 on diaphragm 101 may be varied.

For adjusting the position of plunger 107 in its bore a cam 108 is provided for operation by handle 15 of the retainer valve device 11. The peripheral surface of cam 108 engages the plunger 107 and is so designed as to vary the displacement of plunger 107 against spring 106 and therefore the pressure of said spring against diaphragm 101 in proportion to the extent of movement of handle 15 from the "High Pressure" position to the "Low Pressure" position, or vice versa, providing maximum displacement in the "High Pressure" position and minimum displacement in the "Low Pressure" position.

The selector valve device comprises a casing to which pipes 10 and 104 are connected and a plug valve 109 connected to the retaining valve handle 15 for adjustment thereby and with the cam 108 upon adjustment of the retaining valve device 11. In both the "Direct" and "Slow Direct" positions of handle 15 and of the plug valve 109 the pipe 10 will be lapped by said valve and pipe 104 connected through cavities 110 and 111 (Fig. 6) to an exhaust port 112 whereby diaphragm chambers 48 and 100 will be vented to permit closing of the supply valve 35 by spring 42 and, incidentally, opening of the check valve 96 by spring 106. In the "High Pressure" and "Low Pressure" positions, pipe 10 will be opened to pipe 104 via cavity 113 (Fig. 6) in the plug valve.

When the handle 15 is in either the "Direct" or "Slow Direct" position, release of fluid under pressure from brake cylinder device 5 will occur in the usual manner as through the retaining valve device 11, the maintaining valve device 93 not operating due to venting of pipe 104 and lapping of pipe 10 by the plug valve 109.

Now assume that the handle 15 is in "High Pressure" position at the time the brake cylinder pressure chamber 4 is opened to pipe 10. Pressure of fluid from pipe 10 will become effective through cavity 113 in the plug valve 109 in pipe 104 and thence in diaphragm chambers 48 and 100. In chamber 48 such pressure will deflect diaphragm 45 to open the supply valve 35 for supplying fluid under pressure to valve chamber 97, but at the same time diaphragm 101 will be deflected against spring 106 to permit closing of valve 96 by spring 98. The pressure in the brake cylinder pressure chamber 4, pipe 10 and diaphragm chamber 100 will then reduce through the retaining valve device 11 until the check valves 12, 13 therein close, as above described, to hold a certain pressure in the brake cylinder pressure chamber 4, this certain pressure in chamber 100 acting on diaphragm 101 being adapted to still hold the diaphragm 101 in such position against spring 106 that valve 96 will remain seated. However, if due to leakage, pressure in the brake cylinder pressure chamber 4 and diaphragm chamber 100 continues to reduce, then when such pressure becomes slightly reduced below the certain pressure, above mentioned, spring 106 will deflect diaphragm 101 to open the valve 96 whereupon fluid under pressure will be supplied to the brake cylinder pressure chamber 4 to compensate for such leakage, and maintain such pressure equal substantially to the pressure of spring 106 as adjusted by cam 108 in the "High Pressure" position of handle 15.

If the handle 15 is in "Low Pressure" position at the time the brake cylinder pressure chamber 4 is connected to pipe 10, the supply valve 35 will be opened and the valve 96 closed and such pressure will reduce through the retaining valve device 11 to that at which check valve 12 closes. If the pressure in pipe 10 and thereby in diaphragm chamber 100 continues to reduce due to leakage, then the diaphragm 101 will respond to open check valve 96 to compensate for such leakage, as will be clear from previous description.

*Description—Figs. 7 and 8*

If desired, the retaining valve device 11 of Fig. 5 may be dispensed with and the function thereof embodied in a release check valve 114 of a combined retaining and maintaining valve device 115 shown in Fig. 7. The device 115 comprises a supply valve device 95 identical to that in Fig. 5 and a maintaining valve device 116. The maintaining valve device differs from that in Fig. 5 only in that a stem 117 for unseating the valve 96 is provided on its opposite end with the valve 114 arranged to open and close communication between chamber 100 and a passageway 119 opening through diaphragm 101 to chamber 102 and thence atmosphere via the vent 103.

A selector valve device 120 is provided comprising a plug valve 121 adapted to be turned by a handle 122 to "Direct," "High Pressure," "Low Pressure" and "Slow Direct" positions the same as the handle 15 of the retaining valve device 11, but handle 121 is also adapted to be adjusted to any desired position between the "High Pressure" and "Low Pressure" position. The plug valve 121 is provided with a cavity 123 for in the "Direct" position of handle 122 opening pipe 10 directly to atmosphere via an exhaust port 124 (Fig. 8) to provide for usual release of fluid under pressure from the brake cylinder pressure chamber 4. Pipe 104 is also vented in this position via cavity 123 so that the supply valve 35 will be closed. The plug valve 121 also has a cavity 125 which in the "Slow Direct" position of handle will vent both pipes 10 and 104 via exhaust port 124, but a choke 126 is placed in said cavity to restrict exhaust from the retainer pipe 10 (but not from pipe 104) so as to provide for the slow release of fluid under pressure from the brake cylinder pressure chamber 4 like provided by the restricted passage 26 in the retainer valve device 11. The plug valve 122 also has a cavity 113, like that in the plug valve 109 of Fig. 5, for connecting pipes 10 and 104 in the "High Pressure" and "Low Pressure" positions and all intermediate positions of handle 122.

In operation, if handle 122 should be in the "High Pressure" position when the brake cylinder pressure chamber 4 is connected to pipe 10 pressure of fluid from said chamber will become effective in chamber 48 to open the supply valve 35 and at the same time such pressure becoming effective in chamber 100 will deflect diaphragm 101 to permit seating of valve 96 by spring 98 and opening of the release valve 114. Fluid under pressure will then be released from the brake cylinder pressure chamber 4 past release valve 114, the same as through the retaining valve device 11 in Fig. 5, until reduced to a chosen pressure at which spring 106 will deflect diaphragm 101 into seating engagement with the release valve 114. If leakage from the brake cylinder pressure chamber 4 then continues to reduce the pressure therein and in diaphragm chamber 100, spring 106 will respond to deflect diaphragm 101 to open valve 96 for supplying fluid under pressure to said chambers to compensate for such leakage.

If the handle 122 should be in "Low Pressure" position at the time the brake cylinder pressure chamber 4 is connected to pipe 10 and diaphragm chamber 100, the pressure of fluid in said chambers will be reduced past the release valve 114 to the chosen degree determined by the cam adjustment of spring 106 whereupon said valve will be closed, and in case of leakage of fluid under pressure from said chambers the diaphragm 101 will then operate to open the valve 96 for supplying fluid under pressure to said chambers to compensate for leakage.

Since the cam 108 is designed to vary the pressure of spring 106 on diaphragm 114 according to the position of handle 122 between the "High Pressure" and "Low Pressure" positions, if said handle should be in any position intermediate said positions the release valve 114 will be closed at a corresponding different pressure and, in case of leakage, it will be compensated for in a manner which will be apparent from the above description. The ability to thus retain any one of a number of different pressures in the brake cylinder pressure chamber 4 is desirable in that it not only provides for adjustment of handle 122 according to a grade being descended but also according to the weight of a car or the load carried by the car.

*Summary*

It will now be seen that I have provided means for holding pressure in the brake cylinder device on a car at a selected degree against leakage while recharging the brake apparatus on the car and hence in a train of such cars to better facilitate safe descent of a grade. The invention may constitute a device adapted to be associated with the usual pressure retaining valve device and therefore requiring only the function of maintaining or, if desired, it may also embody the blow down function of the usual retaining valve device. Moreover, if desired, the device may be of a form to maintain the pressure in the brake cylinder device at any desired one of an infinite number of different pressures.

Having now described my invention, what I claim as new and desire to secure by Letters Patent, is:

1. In a fluid pressure brake apparatus for a railway car, in combination, brake means operable by fluid under pressure to effect an application of brakes and upon release of fluid under pressure a release of brakes, a brake pipe, a retainer pipe, brake control means operative upon a reduction in brake pipe pressure to supply fluid under pressure to said brake means and upon an increase in brake pipe pressure to open said brake means to said retainer pipe, a brake cylinder pressure retaining valve device comprising a plurality of valve means for reducing pressure of fluid in said retainer pipe to different respective degrees, and a manually operative valve having different positions for selectively rendering one or another of said valve means effective and the other ineffective to limit pressure of fluid in said retainer pipe and having another position for opening said retainer pipe directly to atmosphere, a maintaining valve device comprising an adjustable spring and means controlled by pressure of said spring for supplying fluid to a chamber at a pressure corresponding to adjustment of said spring, and means operable in unison with said manually operative valve to open said retainer pipe to said chamber in said different positions of said valve and to close such communication in said other position of said valve and to also adjust said spring in said different positions to deliver fluid to said chamber at substantially the pressure to which pressure in said retainer pipe is reduced by the respective one of said plurality of valve means.

2. Means for maintaining pressure of fluid in the retainer pipe of a fluid pressure brake apparatus having a brake cylinder device which is adapted to be opened to said pipe for effecting a release of brakes and a retaining valve device having one position for opening said pipe directly to atmosphere and other positions for reducing pressure in said pipe to different respective chosen degrees, said means comprising a spring, movable abutment means subject to pressure of said spring and opposing pressure of fluid in a chamber, and valve means controlled by said movable abutment means for supplying fluid to said chamber at a pressure corresponding substantially to pressure of said spring, and means operative in unison with said retaining valve device to close communication between said chamber and pipe in said one position and for opening such communication in said other positions and at the same time for varying pressure of said spring according to the different chosen pressures to which the pressure in said pipe is reduced in said other positions.

3. In a fluid pressure brake apparatus of the type comprising a brake cylinder device which is adapted to be opened to a retainer pipe for effecting a release of brakes, the combination of a second pipe, means manually operable by a single handle and having at least one position in which said second pipe and retainer pipe are concurrently opened to atmosphere and movable to other positions in which the retainer pipe is opened to said second pipe, a brake cylinder pressure retaining device controlled by said handle and comprising valve means effective in the said other positions of said handle to retain pressure in the retainer pipe at different respective chosen values above atmosphere, and a brake cylinder pressure maintaining device comprising adjustable regulating means the pressure of which is varied according to the positioning of said manually operable means, movable abutment means subject opposingly to pressure of said regulating means and to pressure of fluid in said second pipe, valve means controlled by said movable abutment means and operative to connect said second pipe to a chamber whenever pressure of fluid in said second pipe is less than the opposing pressure of said regulating means, and other valve means responsive to pressure of fluid in said second pipe to supply fluid under pressure to the chamber and responsive to venting of said second pipe to cut off such supply to the chamber.

4. In a fluid pressure brake apparatus of the type comprising a brake cylinder device which is adapted to be opened to a retainer pipe for effecting a release of brakes, the combination of a conduit, spring means, cam means for adjusting pressure of said spring means, a valve for controlling connection of a branch of the retainer pipe with said conduit, a single means manually operable to a first position and a second position for respectively causing said cam means to adjust pressure of said spring means at a maximum and a minimum value and operable in said positions to also concurrently cause said valve to effect connection of said branch of the retainer pipe to said conduit, a brake cylinder pressure retaining device comprising valve means responsive to operation of said manually operable means to said first and second positions to correspondingly limit release of fluid under pressure from the retainer pipe to substantially said maximum and minimum values respectively, movable abutment means subject to adjusted pressure of said spring means opposing pressure of fluid in said conduit, and other valve means operable by said movable abutment means responsively to a reduction in fluid pressure in said conduit below the adjusted pressure of said spring means to supply fluid under pressure to said conduit until conduit pressure is restored to a value corresponding to the adjusted pressure of said spring means, whereupon said movable abutment means will operate to permit closure of said other valve means for terminating such supply to said conduit and thereby to the retainer pipe.

References Cited in the file of this patent

UNITED STATES PATENTS

| | | |
|---|---|---|
| 902,114 | Savage | Oct. 27, 1908 |
| 934,019 | Savage | Sept. 14, 1909 |
| 1,447,791 | Kummerow | Mar. 6, 1923 |
| 2,204,796 | Farmer | June 18, 1940 |